United States Patent [19]

Barry

[11] Patent Number: 5,508,478
[45] Date of Patent: Apr. 16, 1996

[54] VISIBLE FLAME EXHAUST PIPE

[76] Inventor: James E. Barry, 3251 Northwest 114th St., Coral Springs, Fla. 33065

[21] Appl. No.: 179,901

[22] Filed: Jan. 11, 1994

[51] Int. Cl.$^6$ ............................... F01N 7/08; B60K 13/04
[52] U.S. Cl. ........................ 181/227; 180/309; 180/89.2
[58] Field of Search .................................. 181/224, 227, 181/228, 246; 180/309, 89.2; 40/545, 570, 407; 446/22, 23, 473; D12/194, 110

[56] References Cited

U.S. PATENT DOCUMENTS

| 1,447,749 | 3/1923 | Beselin | 180/89.2 |
| 2,201,588 | 5/1940 | Kuhns | 43/17 |
| 3,562,942 | 2/1971 | Mabrey | 40/545 |
| 4,114,299 | 9/1978 | Browlee | 40/545 |
| 4,596,306 | 6/1986 | Abe et al. | 181/228 |

*Primary Examiner*—Khanh Dang
*Attorney, Agent, or Firm*—Malin, Haley, DiMaggio & Crosby

[57] ABSTRACT

Disclosed is a visible flame exhaust pipe for use with internal combustion engines. A high temperature resistant glass is incorporated within the exhaust system to allow visibility of combustion flames passing through the exhaust pipe as the flame exits the exhaust system.

11 Claims, 6 Drawing Sheets

VISIBLE FLAME EXHAUST PIPE

BACKGROUND OF THE INVENTION

1. Field of the Invention

The present invention relates generally to exhaust pipes and more particularly to a visible flame exhaust pipe for use with internal combustion engines.

2. Description of the Prior Art

The motorcycle has been a means of fun and relatively inexpensive way of traveling for many years. Recently, the motorcycle has found increased popularity and has become widely accepted by a substantial portion of the purchasing public as their primarily means of traveling. Sales figures for various motorcycle companies have reached new highs in recent years.

Many motorcyclist's alter the aesthetics of their motorcycles to fit their own individual image and style. Often the side panels of the motorcycle's gas tank will be painted with a fire or lighting design. One area of the motorcycle which in the past has not been looked to for potential image tailoring is the motorcycle's exhaust pipe or tailpipe. While the motorcycle is running an exhaust flame is hidden within the tailpipe. Though this combustion flame would create a valuable aesthetic addition to the motorcycle and the motorcyclist's image, the prior art has yet to find a way to have the flame visible without the possibility of potential danger to the rider.

In the automobile and truck industry the advent of neon, ranging in various colors, around the license plate and/or under the frame of the vehicle has recently been used to enhance the visibility of the vehicle during nighttime driving as well as providing a novelty effect. However, the use of neon lighting is not as readily adaptable or applicable to motorcycles and would not create the same novelty effect on a motorcycle as an automobile.

Furthermore, other devices which utilized an internal combustion engine would also benefit from having a visible combustion flames. Some of the possible applications are boats, showcars, etc.

Thus, what is needed in the art is a device or apparatus that allows for visibility of the combustion flame traveling through an exhaust or tailpipe. In addition, the device must be safe and not increase the chance of injury. It is, therefore, to the effective resolution of the aforementioned problems and shortcomings that the present invention is directed.

SUMMARY OF THE INVENTION

Generally, the invention relates to an exhaust pipe or tailpipe which is attached to an internal combustion engine, such as an engine used by a motorcycle, automobile, truck, boat, etc. In one embodiment a portion of a conventional metal tailpipe is removed which exposes the inside of the tailpipe. Inserted within the tail pipe is a clear glass tube, constructed of a high temperature, heat resistant glass. The glass is held in position where the portion of the metal pipe has been removed. Means is provided to direct the combustion flame down the middle of the glass tube. Thus, when the internal combustion engine to which the exhaust pipe is attached to is running, the combustion flame is seen through the glass tube. Furthermore, the glass tube also prevents the combustion flame from escaping through the remove portion of the pipe and causing potential harm or injury to an individual such as a motorcyclist.

In a second embodiment a complete cylindrical piece of the metal pipe is removed and replace with a cylindrical glass piece resembling in size and shape the piece of pipe removed. Gaskets and clamps are utilized to attach the glass piece to the two remaining pieces of the original tailpipe. The gaskets and clamps also prevent leakage of exhaust gases where the glass and exhaust pipe meet. Similar to the first embodiment, the combustion flame is seen through the glass. Furthermore, the glass piece also prevents the combustion flame from escaping through the remove portion of the pipe and causing potential harm or injury to an individual such as a motorcyclist.

Accordingly, it is an object of the present invention to allow the visibility of combustion flames passing through the exhaust pipe or tailpipe as the combustion flames exit the exhaust system.

It is another object of the present invention to enhance the visibility of a motorcycle during nighttime travel.

It is a further object of the present invention to provide additional safety to a motorcyclist during nighttime travel.

It is yet another object of the present invention to add a novelty feature to an exhaust pipe or tailpipe.

Other objects and advantages of this invention will become apparent from the following description taken in conjunction with the accompanying drawings wherein set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

The invention may be better understood by reference to the drawings in which.

DETAILED DESCRIPTION OF THE INVENTION

Figure 1:
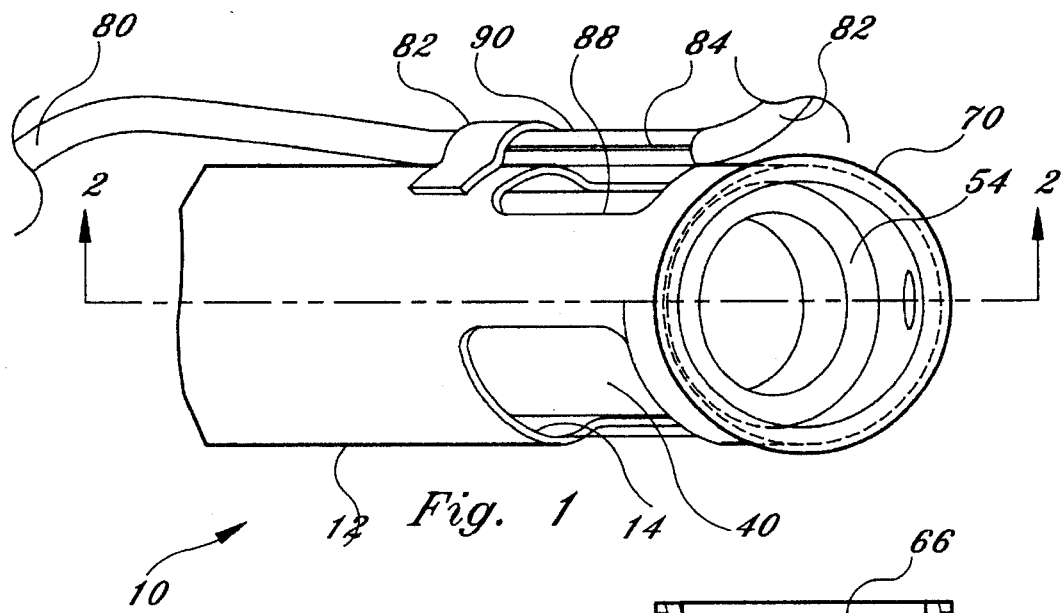
FIG. 1 is an isometric view of the first embodiment of the present invention.
Figure 2:
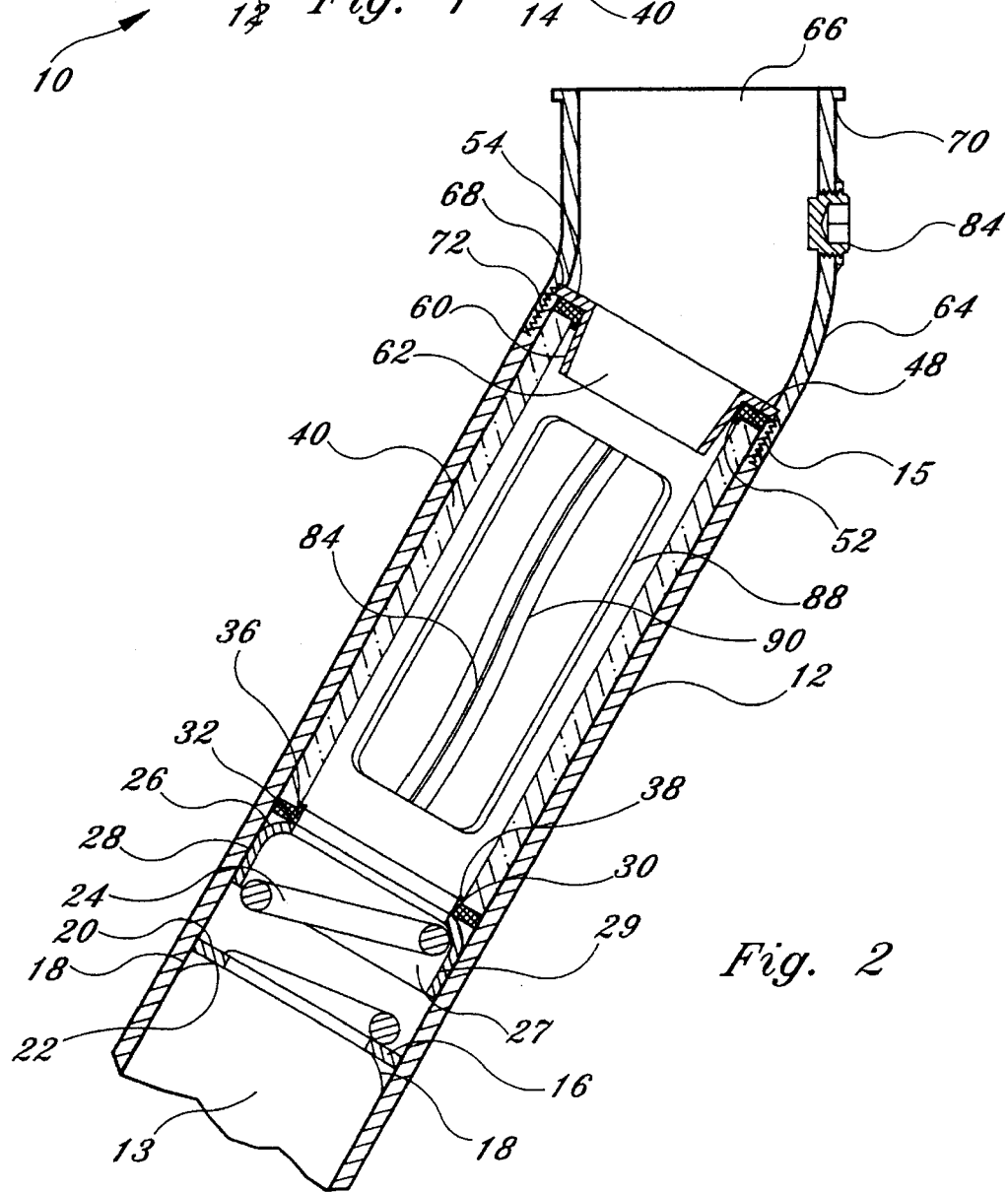
FIG. 2 is a sectional view taken along the line 2—2 of FIG. 1.
Figure 3:
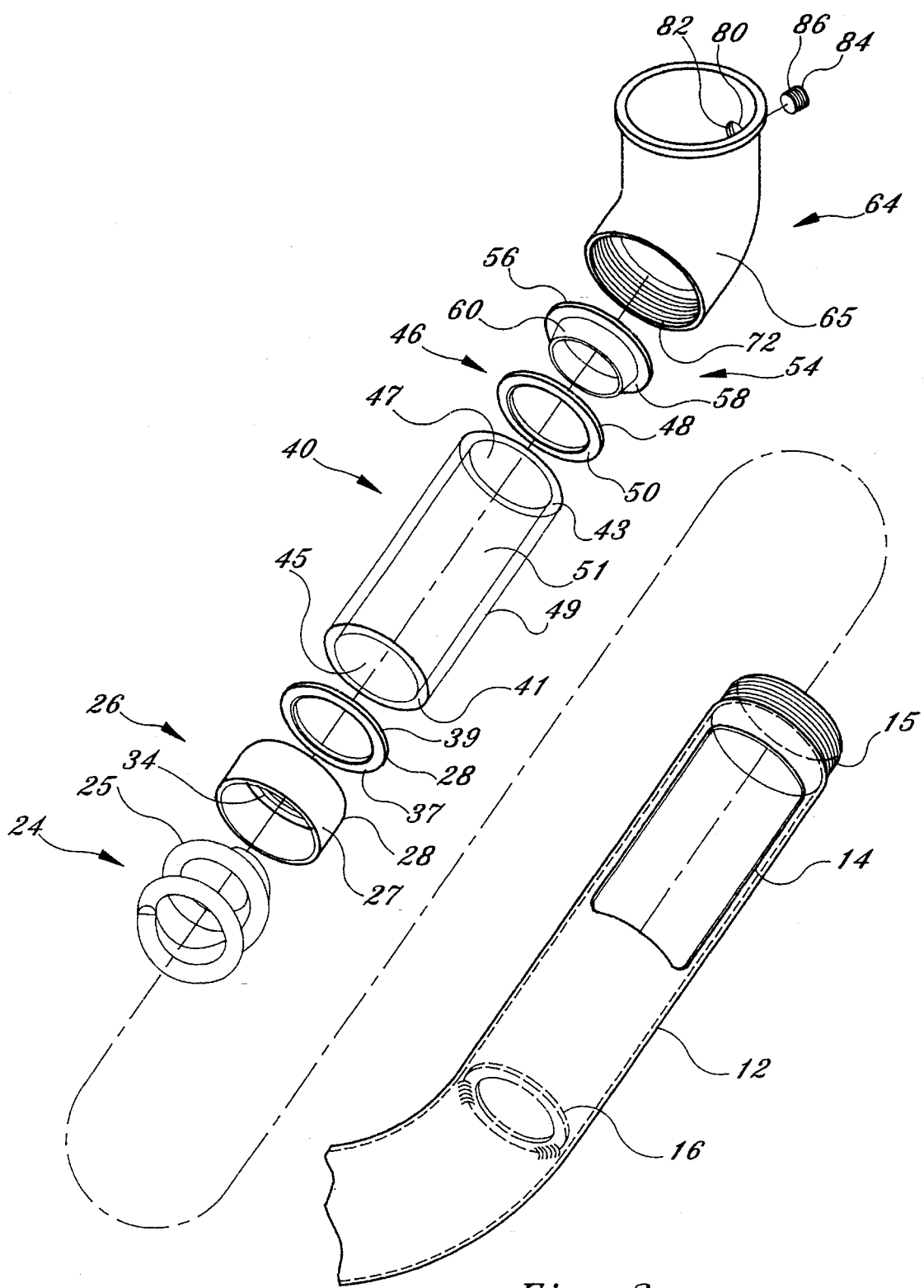
FIG. 3 is an exploded isometric view of the first embodiment of the present invention.

As seen in FIGS. 1–3, the preferred and first embodiment of the visible flame exhaust pipe is shown generally at 10. Pipe 10 includes an elongated body member 12 and is used in conjunction with a conventional internal combustion engine (not shown). As seen in FIGS. 2 and 3 a bottom washer 16 is shown attached to the inner cylindrical wall 13 of exhaust or tail pipe 12 at location 18 along pipe 12. First washer 16 has an upper surface 20 and a lower surface 22. Washer 16 can be attached to cylindrical sidewall 13 at location 18 by conventional means and in the preferred embodiment is attached by welding. Preferably, washer 16 is constructed from metal. In another embodiment, washer 16 could be formed into pipe 12 as a rim during the construction of the pipe 12.

A spring 24, having a plurality of coils 25, is shown resting along upper surface 20 of washer 16. Spring 24 allows a little tension pressure while holding glass tube 40 (discussed in detail below) in place. Washer 16 holds spring 24 in proper position. A sealing cup 26 is shown disposed over and covering a portion of spring 24. Sealing cup 26 includes a sidewall portion 27 having an outer surface 28 and an inner surface 29 and a top portion 30 constructed integral with sidewall portion 27. Top portion 30 is shown having an upper surface 32 and a lower surface 34. Outer surface 28 is shown tightly abutting or adhering to sidewall 13 to prevent leakage of gases from the exhaust system. Sealing cup 26 is disposed over spring 24 until the top of spring 24 is abutting lower surface 34. Sidewall portion 27 helps prevent spring 24 from rattling during operation of the internal combustion engine. As seen in FIG. 2, to prevent leakage and rattling, sealing cup 26 only is required to cover a portion of spring 24.

A first gasket 36 having an upper surface 39 and a lower surface 37 is shown resting on top of sealing cup 26. Specifically, lower surface 37 of gasket 36 is abutting upper surface 32 of sealing cup 26. An inner lip 38 is constructed integral with gasket 36. A glass tube 40 is shown having a bottom surface 41, top surface 43, sidewall 49, first aperture 45 and a second aperture 47. The outer diameter of glass tube 40 can be the same as spring 24. Sidewall 49 defines a cavity 51 in glass tube 40 extending from bottom surface 41 to top surface 43, which will be further discussed in detail below. First aperture 45 is sized to snugly receive lip 38 of gasket 36. When lip 38 is fully received by aperture 45, bottom surface 41 of glass tube 40 is abutting upper surface 39 of 36.

A second gasket 46 is disposed above glass tube 40. Similar to first gasket 36, gasket 46 includes an upper surface 48 and a lower surface 50. Lower surface 50 is shown abutting top surface 43. An inner lip 52 is constructed integral with gasket 46. Second aperture 47 is sized to snugly receive lip 52 of gasket 46. When lip 52 is fully received by aperture 47, top surface 43 of glass tube 40 is abutting lower surface 50 of gasket 46. Washer 16 and gaskets 36 and 46 all have a hole in the middle to allow the exhaust gases to escape from pipe 12. Furthermore, gaskets 36 and 46 help protect the bottom surface 41 and top surface 43 of glass tube 40, respectively. Gaskets 36 and 46 act as cushion for glass tube 40 and prevent the glass tube from touching metal pipe 12, metal sealing cup 26, and directing shield 54, discussed below. Gaskets also act as a seal by preventing exhaust gases from traveling between the inner surface of pipe 12 and the outer surface of sidewall 49 of glass tube 40. Thus, gaskets 36 and 46, in conjunction with directing shield 54, assure that the exhaust gas travels through the middle of glass tube 40 through cavity 51.

A directing shield 54 is shown disposed above second gasket 46 and includes an upper surface 56, a lower surface 58 and a tapered throat portion 60 which defines a tapered cavity 62. Tapered portion 60 is shown inserted through gasket 46 and into cavity 51 of glass tube 40. Thus, when tapered portion 60 is inserted into glass tube 40, cavity 62 communicates with cavity 51. When tapered portion 60 is fully inserted within cavity 51, lower surface 58 is abutting upper surface 48 of gasket 46. Tapered portion 60 directs the hot gases down the middle of glass tube 40 so that tube 40 does not carbonized and remains clear. If the exhaust gases hit glass tube 40, the carbon in the gases will stick to sidewall 49 of glass tube 40. Shield 54 also causes the hot gases to avoid gasket 46, which would eventually fail over time if not shielded from the hot gases.

A seen in FIG. 3, a slot 14 is created in pipe 12 by the removal of a portion of sidewall 13 by conventional cutting means. Alternatively, the pipe can be constructed with the slot in the exhaust pipe. The remaining portion of pipe 12 is conventional and the removal of the a portion of the sidewall and the addition of glass tube 40, discussed below, assure that the pipe 12 acts similar to a conventional metal exhaust pipe while also allowing at least a portion of the exhaust flame to be visible. Slot 14 allows for viewing within the tailpipe and thus at least a portion of the flame generated by the operation of the internal combustion engine. Pipe 12 also contains a plurality of male threads 15 at the top end of pipe 12 for mating with a plurality of female threads 72 disposed on the inner surface of elbow 64.

Elbow 64 includes sidewall 65 defining a cavity 66 extending therethrough from a first end to a second end of elbow 64. The plurality of female threads 72 are disposed near the first end of elbow 64 on the inner surface of sidewall 65. A shoulder 68 is also disposed on the inner surface of sidewall 65 intermediate female threads 72 and the bend in elbow 64. Shoulder 68 acts as a stop to the directing shield 54 when the complete assembly is connected, as well as an aid in aligning glass tube 40 with slot 14 for viewing the exhaust flame. Thus, when connected spring 24, gaskets 36 and 46, glass tube 40 and directing shield are retained between washer 16 and shoulder 68. Shoulder 68 can be a rim constructed integral with elbow 64 or any other means which will prevent directing shield 54 from traveling further into cavity 66. Shoulder 68 can also be a second washer welded into cavity 66 of elbow 64 similar to washer 16 and the inner surface of sidewall 13 of pipe 12. A flange 70 is shown disposed at the second end of elbow 64. Flange 70 is bolted to the exhaust board of a cylinder head (not shown) in any conventional means as is common in the art.

Elbow 64 also has a cleaning port opening 80 disposed through a portion of sidewall 65. Port 80 can have a plurality female threads 82 disposed thereon. A sealing cap 84 is provided having a plurality of male threads 86 for mating with female threads 82 during the operation of the internal combustion engine. This mating relationship provides a seal at port 80 and does not allow any exhaust gases to escape through port 80. Over time the operating of the internal combustion engine will cause carbon to build up on sidewall 49 of glass tube 40. Port 80 is provided to allow a cleaning solution dispensing mechanism (not shown) to be inserted into cavity 66 of elbow 64 and spray or dispose a cleaning solution onto sidewall 49 to remove the carbon build up.

Thus, to clean the carbon buildup on sidewall 49 without removing pipe 12 from elbow 64, cap 84 is removed from its mating relationship with port 80 and the dispensing mechanism is inserted into cavity 66 through port 80 where it dispenses cleaning solution onto sidewall 49. Once the dispensing mechanism is removed from elbow 64, cap 84 is reinserted in port 80, by the mating relationship of threads 82 and 82, to provide a seal at port 80. Preferably, cap 84 is disposed far enough into port 80 to avoid sticking out while still allowing access to cap 84 for removal of such from port 80.

In operation, spring 24, with sealing cup 26 disposed over at least a portion thereof, is inserted into the top end of pipe 12 until spring 24 is resting upon washer 16. Alternatively, spring 24 can be inserted separately and then followed by the insertion of sealing cup 26 into the top end of pipe 12 until sealing cup 26 is disposed over spring 24. Lips 38 and 52 are inserted into first aperture 45 and second aperture 47 of glass tube 40, respectively and the entire composite piece (washers 36 and 46 and glass tube 40) is inserted into the top end of pipe 12 until washer 36 is resting upon sealing cup 26. Alternatively, washer 36 can be inserted separately, followed by glass tube 40 and washer 46. Directing shield 54 is then inserted into the top end of pipe 12 thus allowing cavity 62 of tapered portion 60 to be fully communicating with cavity 51 of glass tube 40. Once directing shield 54 has been inserted, pipe 12 is ready for mating with elbow 64.

To attach pipe 12 to elbow 64, the top end of pipe 12 is inserted within the first end of elbow thus, allowing pipe threads 15 to mate with threads 72 disposed on the inner surface of elbow 64. With each turn of pipe 12 along the thread 72 track, additional tension pressure is applied to spring 24 causing coils 25 of spring 24 to compress. This compression is a direct result of the additional pressure being applied by shoulder 68 on directing shield 54, which in turn applies pressure on glass tube 40 and ultimately to spring 24 which is fixed in place by washer 16. When threads 15 and 72 have been fully mated (pipe 12 is securely attached to elbow 64), glass tube 40 is aligned with slot 14 to allow proper and safe viewing of the combustion flame. Though the above described threading arrangement is the preferred embodiment for attaching pipe 12 to elbow 64, other conventional attaching arrangements are within the scope of the present invention, such as snaps, glue, etc.

When the internal combustion engine is running, high temperature gases flow out through exhaust pipe 12. These high temperature gases cause pipe 12 and glass tube 40 to expand. However, pipe 12 has a greater coefficient of expansion than glass tube 40. Spring 24 is required to compensate for the differences in expansion rates. Thus, as pipe 12 begins to expand outward, shoulder 68 is applying less and less pressure on directing shield 54 which causes spring 24 to also expand out from its compress state out, at nearly the same rate as pipe 12 in order to continuously maintain glass tube 40 in its aligned position with slot 14. The cooling of pipe 12 causes pipe 12 to retract which in turn causes shoulder 68 to apply additional pressure on directing shield 54 which ultimately causes spring 24 to also retract in relation to pipe 12. Thus, whether pipe 12 is stable, expanding or retracting, based on a given temperature, spring 24, in conjunction with washer 16 and shoulder 68, assures that glass tube 40 is properly aligned with slot 14 to provide maximum visibility of at least a portion of an combustion flame.

In an alternative embodiment, spring 24 and sealing cup 26 can be substituted for by a metal collar. In this embodiment, the metal selected for the collar will require a larger coefficient of expansion that the expansion coefficient of pipe 12 due to the fact that the length of expansion for the collar is much smaller than the length of expansion for the pipe. In this embodiment, the preferred embodiment is either copper, nickel or brass. Thus, the expansion of the collar due to the high temperature exhaust gases corresponds to the function of spring 24. Furthermore, as the collar snugly abuts sidewall 13, the collar achieves the sealing functions of sealing cup 26.

Glass tube 40 is constructed from a high temperature heat resistant glass material such as quartz, pyrex, vigor, etc. Glass tube 40 must be able to withstand temperatures of at least 900 degrees. Gaskets 36 and 46 are also be high temperature and heat resistant being able to withstand the same temperatures as glass tube 40.

A slip cover means (not shown) can be place over slot 14 exhaust pipe 12 to protect glass tube 40 when the motorcyclist does not desire to have the flame visible.

Figure 4:
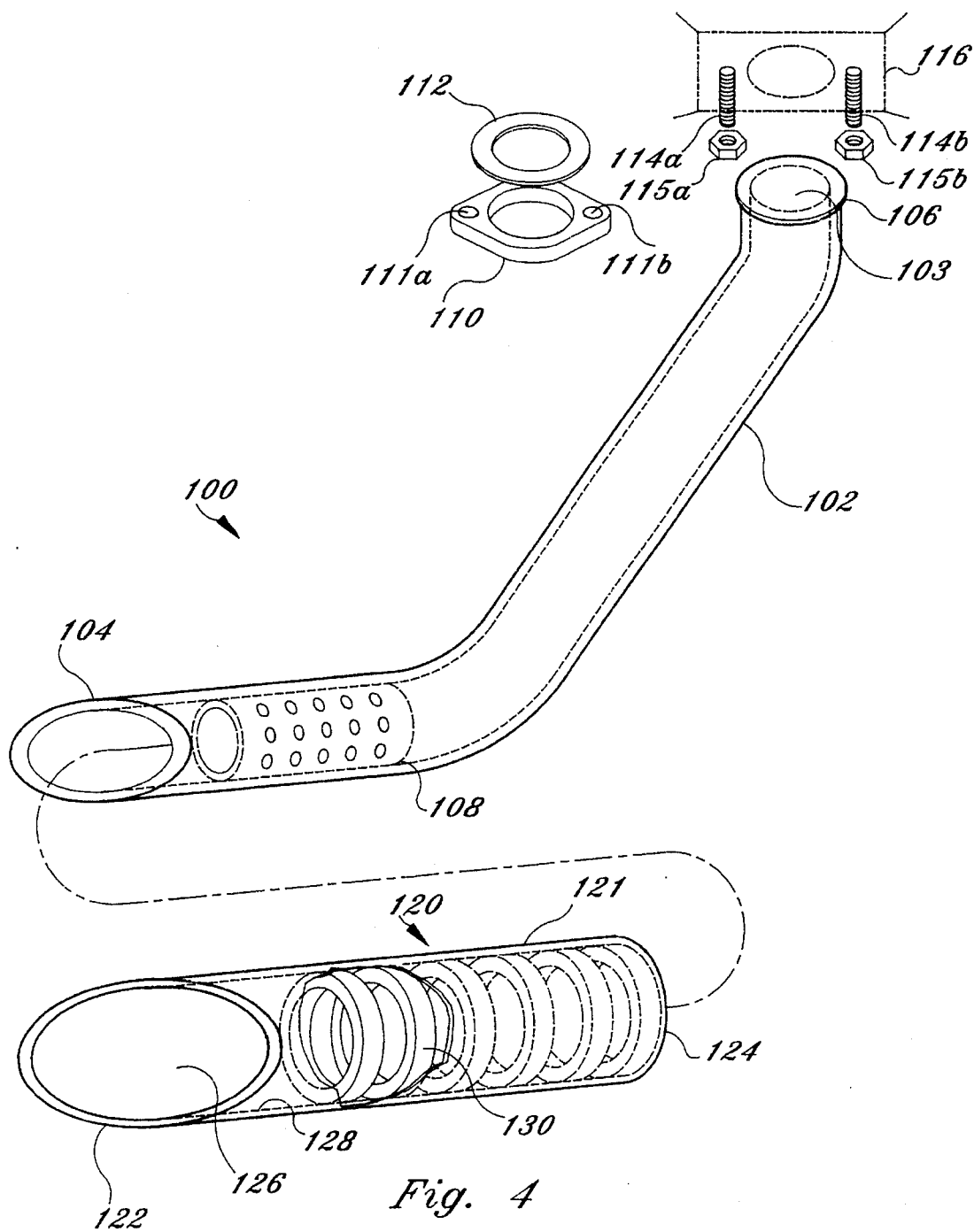
FIG. 4 is an isometric view of the second embodiment of the present invention.
Figure 5:
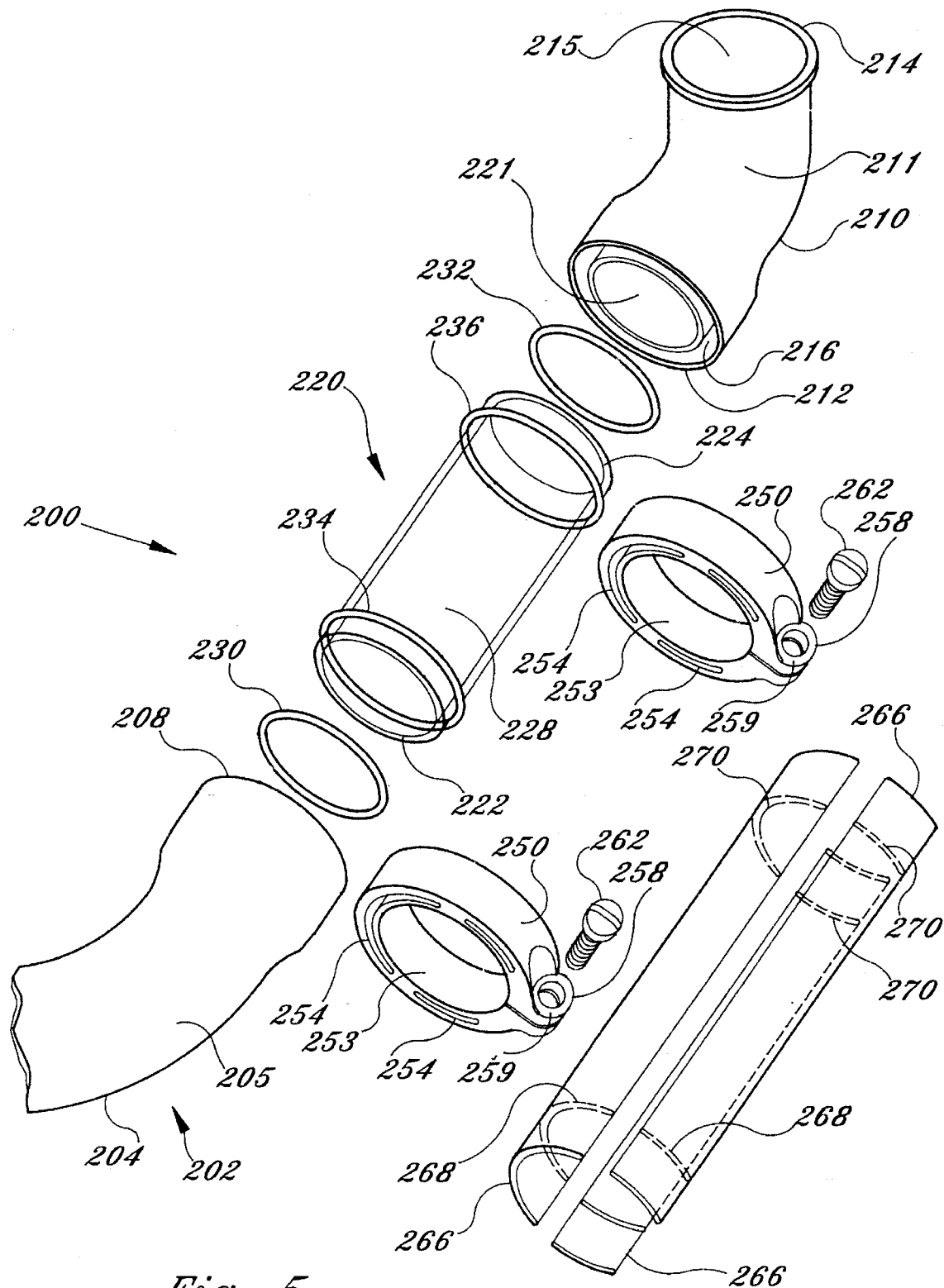
FIG. 5 is an exploded isometric view of the third embodiment of the present invention.

A second embodiment of the present invention is shown in FIG. 4. In this embodiment the visible exhaust pipe assembly is generally shown at 100 and includes an elongated pipe body 102 constructed from a high temperature heat resistant glass. Body. 102 can be constructed from the same high temperature heat resistant glass as glass tube 40 in the first embodiment of the present invention. Body 102 is shown having a slash cut at a first end 104 and is attached at a second end 106 to an exhaust board 116 discussed further below. Elongated body member 102 defines an internal cavity 103 disposed from first end 104 to second end 106. Shown disposed within cavity 103 is a muffler 108 for reducing the sound traveling through body 102. However, it is to be understood that the slash cut at end 104 and muffler 100 are optional and it is within the scope of this embodiment of the present invention to have elongated glass body member without a slash cut at one end or a muffler disposed within.

A gasket 112 and a clamp 110 are provided along with motor exhaust port stud nuts 114a and 114b to attached end 106 of body 102 to motor exhaust port studs 115a and 115b of exhaust board 116. Clamp 110 and gasket 112 each have a centerhole for the insertion of end 106 therethrough. Thus, to attach clamp 110 and gasket 112 to body 102, clamp 110 and gasket 112 are slid over body 102 at end 106 to provide a snug and tight fit between clamp 110, gasket 112 and body 102. Furthermore, clamp 110 has a plurality of holes 111a and 111b disposed at each end of clamp 110 for attachment to studs 115a and 115b, respectively, discussed below. An additional exhaust gasket (not shown) shaped similar to clamp 110, including all three holes, may also be provided and is disposed between clamp 110 and exhaust board 116. The additional exhaust gasket may also be substituted for gasket 112.

To attach body 102 to exhaust board 116, clamp 110 and gasket 112 are attached to body as described above. Studs 115a and 115b are inserted through holes 111a and 111b, respectively, and respective nuts 114a and 114b are disposed on studs 115a and 115b to tightened the connection of clamp 110 (and ultimately body 102) to exhaust board 116. Thus once nuts 114a and 114b are tightened body 102 is securely connected to exhaust board or port 116. First end 104 may also be secured by conventional means. Gasket 112 and/or additional exhaust gasket also provides a seal to prevent any exhaust gases from leaking out at the connection point between end 106 and exhaust board 116 thus assuring the exhaust gases will travel in and through cavity 103.

A slip cover 120 is provided to protect body 102 and preferably is disposed from first end 104 to the bend in body 102. Slip cover 120 can be constructed from metal. Slip cover 120 includes a body member 121 having a first end 122 (which can also have a slash cut) and a second end 124. Body member 121 defines a cavity 126 extending from first end 122 to second 124.

Glass exhaust pipe body 102 is known to rattle during the operation of the internal combustion engine. Thus, to prevent body 102 from touching cover 120, a plurality of high temperature bonding rings 130 are disposed along an inner wall 128 of body 121. Bonding rings 130 provide a cushion between glass body 102 and metal slip cover 120. Thus, in the second embodiment, when the internal combustion engine is running combustion flames in addition to traveling through cavity 103 are also visible through glass body 102.

FIGS. 5 through 8 illustrate a third embodiment of the present invention. In this embodiment the visible exhaust assembly is generally shown at 200. A complete cylindrical piece (not shown) of metal exhaust pipe 202 is removed thus leaving a first metal pipe 204, having a first end 206, a second end 208 and a sidewall 205, and a second metal pipe 210, having a first end 212, a second end 214 and a sidewall 211. A cavity 213 is defined by sidewall 205 extending from first end 206 to second end 208 of first metal pipe 204. Similarly, a cavity 215 is defined by sidewall 211 extending from first end 212 to second end 214 of second metal pipe 210. The removed cylindrical piece is replaced with a cylindrical glass piece 220 resembling in size and shape the piece of pipe removed.

Disposed within cavity 213 at end 208 of first pipe 204 and within cavity 215 at end 212 of second pipe 210 are cylindrical partitions 207 and 216, respectively. Partitions 207 and 216 define inner cavities 219 and 221, respectively, extending from the first end to the second end of said partitions. Partition cavities 219 and 221 communicate with pipe cavities 213 and 215, respectively. Partitions 207 and 216 along with a respective portion of the inner surface of sidewalls 205 and 211 define respective cup-like channels 209 and 217, respectively at ends 208 and 212. Preferably, partitions 207 and 216 are formed integral with pipes 204 and 210, respectively.

Glass piece or pipe 220 is constructed from a high temperature heat resistant material and is shaped similar to glass tube 40, having a first aperture 222, second aperture 224 and sidewall 226. Side wall 226 defines an inner cavity 228 extending from first aperture 222 to second aperture 224.

Primary gaskets 230 and 232 are provided for insertion into the bottom of channels 209 and 217, respectively, at a point where sidewalls 205 and 211 meet respective cylindrical partitions 207 and 216. Primary gaskets 230 and 232 are provided to protect the respective ends of glass piece 220 when glass piece 220 is attached to pipes 204 and 210, discussed below.

Secondary gaskets 234 and 236 can be provided to prevent glass piece 220 from hitting the inner surface of sidewalls 205 and 211 when glass piece is attached to pipes 204 and 210. Secondary gaskets 234 and 236, as well as primary gaskets 230 and 232, have openings extending therethrough. Gaskets 234 and 236 are disposed on the outer surface of sidewall 226 near respective first and second ends of glass piece 220, preferably, prior to the insertion of glass piece 220 into respective pipe cavities 213 and 215.

Figure 6:
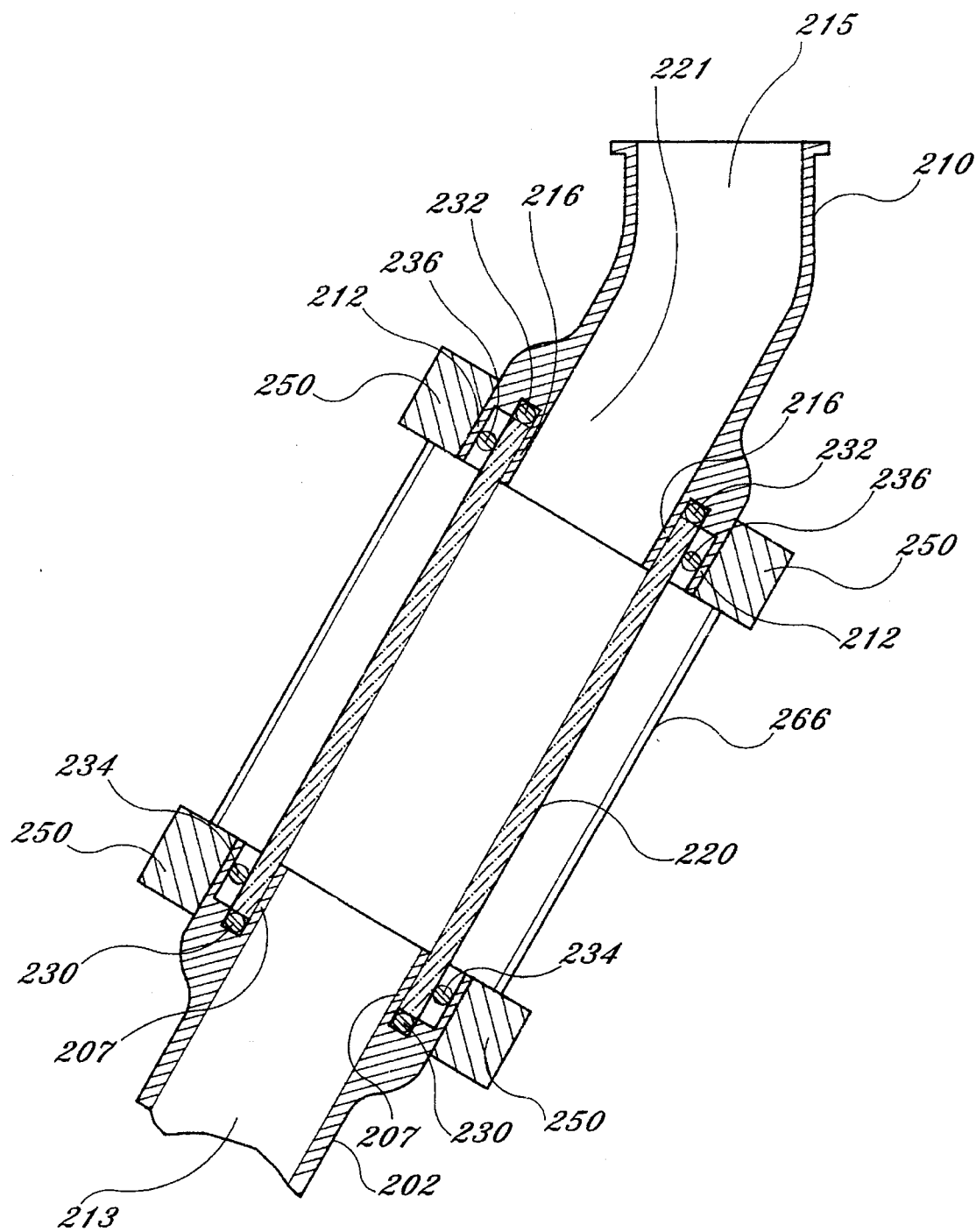
FIG. 6 is a sectional view taken along the line 6—6 of FIG. 8.
Figures 7, 8:
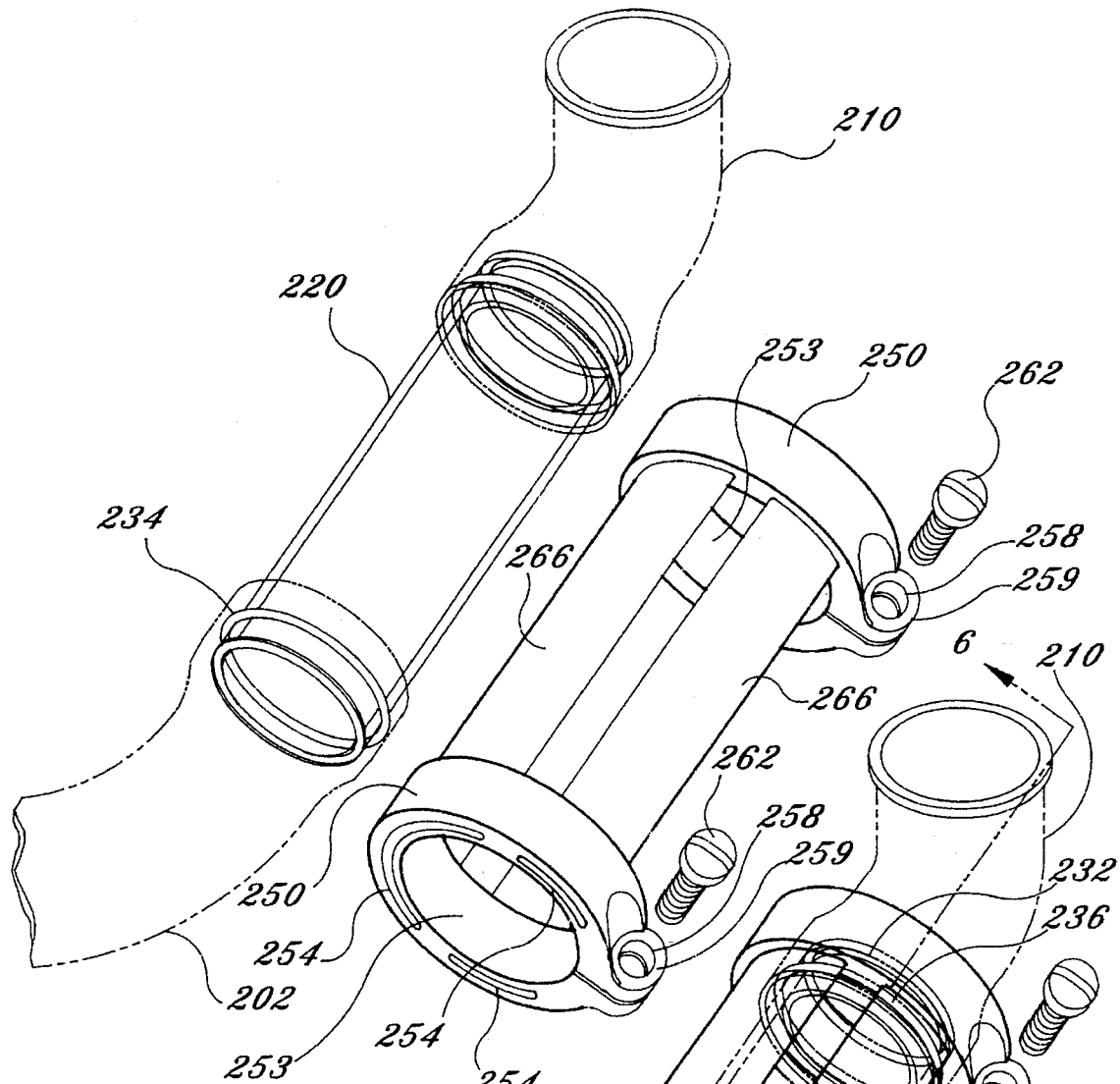
FIG. 7 is an isometric view of the third embodiment of the present invention before the clamp portion is attached.
FIG. 8 is an isometric view of the third embodiment of the present invention.

Once primary gaskets 230 and 232 are resting at the bottom of cup-like channels 209 and 217, respectively and secondary gaskets are disposed at respective ends of glass piece 220, glass piece 220 is then inserted into channels 209 and 217 until the respective ends of glass piece 220 are abutting primary gaskets 230 and 232. As seen in FIG. 6, partitions 207 and 216 are inserted in aperture 222 and 224, respectively, of glass pipe 220 to allow cavities 213 and 215 to communicate with the inner cavity of glass pipe 220.

Once the respective ends of glass pipe 220 are fully inserted into channels 209 and 217, primary gaskets provide a cushion protection to the ends of glass pipe 220 by preventing such from touching metal pipes 202 and 210. Secondary gaskets 234 and 236 provide a cushion protection to pipe 220 by preventing the ends of sidewall 226 from touching the inner surface of pipes 202 and 210, respectively. Furthermore, primary gaskets 230 and 232, as well as secondary gaskets 234 and 236 provide additional sealing means at the connection points between glass pipe 220 and metal pipes 202 and 210 thus preventing the leakage of exhaust gases where the glass and exhaust pipe meet.

Clamps 250 are provided to help retain glass pipe 220 within channels 209 and 217. Clamps 250 are preferably cylindrical in shape, having a center aperture 253 extending therethrough which resembles the shape of glass pipe 220. An outer locking flange member pair 259 having centerholes 258 are also provided on clamps 250 for tightening clamp 250, discussed below. Flange member pair 259 are disposed at each end of clamp 250 and meet to allow their respective centerholes 258 to be aligned for insertion of a bolt 262. Centerholes 258 can have a plurality of female threads for mating with a plurality of male threads disposed on bolts 262. Similar to the first embodiment of the present invention, pipe 210 can have a cleaning port (not shown in this embodiment) which is sealed, when not be used, by a cap (also not shown in this embodiment) to facilitate cleaning of glass pipe 220 without removing clamps 250 from their attached position on pipes 202 and 210. The cleaning port may be provided with male threads for mating with female threads which would be disposed on the cap.

Once glass pipe 220 is fully inserted into channels 209 and 217, clamps 250 are disposed over the outer surface of sidewalls 205 and 211, respectively, adjacent to respective cup-like channels 209 and 217. Bolts 262 are received within apertures 258 of flanges 259 and tightened until the pressure exerted by clamps 250 on sidewalls 205 and 211 securely retains respective first and second ends of glass pipe 220 within cup-like channels 209 and 217, respectively. Clamps 250 also help prevent the leakage of exhaust gases where the glass and exhaust pipe meet.

A plurality of slots 254, preferably extending through clamp 250, can also be provided. Slots 250 are provided to receive respective metal heatshields or rods 266. During the operation of the internal combustion engine, engine torque causes a twist in pipe 210 which is connected to an exhaust board by conventional means. Glass pipe 220 being constructed from glass has no sheer strength or integrity. Without a way of bypassing glass pipe 220, such twist in pipe 210 would instantly crack and/or break glass pipe 220. Thus, rods 266 substitute as a structural member in replace of glass pipe 220, and the twist in pipe 210 is seen through rods 266 to pipe 202 and bypass glass pipe 220. Accordingly, rods 266 take the structural stress of glass pipe 220.

Rods 266 are shaped according to the shape of a respective slot 254 on clamp 250. Each end of rod 266 is inserted into a corresponding slot 254 to achieve the desired stress bypass discussed above. Rods 266 can also be provided with stop means 268 to indicate when an inserted end of rod 266 is sufficiently received within slot 254.

In operation, primary gaskets 230 and 232 are inserted within the bottom of channels 209 and 217, respectively and secondary gaskets 234 and 236 are disposed at each end of glass pipe 220 around the outer surface of sidewall 226. First and second ends of glass pipe 220 are inserted within respective channel 209 and 217 until such ends are abutting gaskets 230 and 232, respectively. First and second ends make a snug and tight fit with partitions 207 and 216 to prevent any rattling between such, which could damage glass pipe 220 during the operation of the internal combustion engine. Clamps 250, having rods 226 fully received within slots 254, are disposed and tightened over the outer surface of sidewalls 205 and 211, adjacent channels 209 and 217, to securely retain glass pipe 220 within channels 209 and 217, and to alleviate any structural stress on glass pipe 220.

The color of the visible flame will depend on several factors, including the following: (1) how hard the internal combustion engine is running; (2) the load to which the internal combustion engine is attached; (3) the throttle; (4) type of fuel utilized and (5) the ignition advance (timing of engine). Based on these factors, as well as others, the visible flame can either be blue, red, violet, orange.

As seen in FIGS. 1 and 2, an illumination means can also be provided to increase the visibility of the exhaust flame during daytime travel. In one embodiment the illumination means includes a high tension conductor 84 which is mounted to body member 12 by at least one mounting clip 82 disposed on the outside surface of body member 12. High tension conductor 84 is disposed within high tension wire 80 except where wire 80 is adjacent to slot 14. At this location along wire 80 a transparent cover 90 is provided to protect conductor 84 and allow conductor 84 to illuminate the area within body member 12 where the exhaust flame is visible within the exhaust pipe or tailpipe. A first end of wire 80 is attached to an ignition coil end (not shown) while the second end is attached to the internal combustion engine system (not shown). In one embodiment the second end of wire 80 is attached to a motorcycle's spark plug (not shown). In operation, a spark from the spark plug travels along conductor 84 and is seen through the transparent cover and illuminates the adjacent area within body member 12. A plurality or bundles of fiber optic strands can be substituted for conductor 84 in which light from the spark will travel along the strands. Though conductor 84 is shown mounted to the outside of body member 12, such is not limiting and thus, conductor 84 may be mounted within body member 12 and provide sufficient illumination.

In an alternative illumination embodiment, a light bulb may be mounted either to the inner surface or outer surface of body member 12. The light bulb circuit can be the same circuit as the spark plug's circuit, in which the light is fired off the spark plug. The light bulb or tube can be mounted to a bump on body member 12 or can be welded to body member 12. Thus, each spark causes a burst of light to be seen within the body member 12 to aid in the visibility of the exhaust flame disposed within body member during the daytime. The bulb can be attached to body member 12 adjacent glass tube 40 to provide maximum illumination.

In either illumination embodiment, the illumination means can be disconnected during night time travel which does not require the additional illumination for flame visibility. Furthermore, though not shown, illumination means can also be provided on any of the embodiments of the present invention. For example, light bulbs, connected to associated circuitry, can be attached to at least one of the metal rods 266 of the third embodiment to supply illumination to glass body member 220.

The present invention can be used with various machines which utilize internal combustion engines, i.e., motorcycles, showcars, automobiles, trucks, vehicles, buses, boats, etc. Furthermore, while the exhaust pipe or tail pipe has been shown to be cylindrical, the present invention is not limited to such, and other design shapes for such pipes may be utilized and is considered to within the scope of the present invention.

It should also be understood that while a rectangular portion of sidewall 13 is shown removed from tailpipe 12, this is not limiting and other shapes or designs could be substituted and are within the scope of the present invention. Any design which will allow the flame within tailpipe 12 to be wholly or partially visible is within the scope of the present invention. In another embodiment the entire or substantial portion of the tailpipe could be constructed from glass with one end of the glass having male threads for mating with the exhaust board.

It is to be further understood that though a high temperature heat resistant glass is the preferred material for viewing the combustion flame in all the above described embodiments, such is not limiting. Thus, any transparent material which has high temperature heat resistant characteristics may be utilized and is within the scope of the present invention.

The present invention can be utilized with tail pipes or exhaust pipes of various designs and shapes. Thus, though the above embodiments have been discussed in conjunction with circular tailpipes, it is to be understood that any designs modifications which would be required to conform the present invention to non-circular shaped tail pipes or exhaust pipes are also within the scope of the present invention.

It is to be understood that while we have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim is:

1. A visible flame exhaust pipe or tailpipe, comprising:
    an elongated body member having a first open end, a second open end, an inner surface and an outer surface, said body member defining a first internal passageway therethrough extending from the first open end to the second open end of said body member, said body member having an aperture disposed along a portion of said elongated body member, said elongated body member shaped to resemble an exhaust pipe or tailpipe;
    a transparent member having a first end, a second end and a sidewall; and
    means for retaining said transparent member aligned with said apertures, said means for retaining disposed within said elongated body member.

2. A visible flame exhaust pipe or tailpipe, comprising:
    an elongated body member having a first end, a second end, an inner surface and an outer surface, said body member defining a first internal passageway therethrough extending from the first end to the second end of said body member, said body member having an aperture disposed along a portion of said elongated body member;
    a transparent member having a first end, a second end and a sidewall; and
    means for retaining said transparent member aligned with said aperture, said means for retaining disposed within said elongated body member;
    wherein said means for retaining comprising a first stop means disposed within said first internal passageway intermediate said transparent member and the first end of said body member, a second stop means disposed within said first internal passageway intermediate said transparent member and the second end of said body member and means for compensating for the expansion and retraction of said body member, said means for compensating disposed within said body member.

3. The visible flame pipe of claim 2, wherein said means for compensating is a spring disposed between said first stop means and said transparent member within said first internal passageway.

4. The visible flame pipe of claim 2, wherein said means for compensating is a collar disposed between said first stop means and said transparent member within said first internal passageway, said collar having a greater coefficient of expansion than said body member.

5. A visible flame exhaust pipe or tailpipe comprising:
an elongated body member having a first end, a second end, an inner surface and an outer surface, said body member defining a first internal passageway therethrough extending from the first end to the second end of said body member, said body member having an aperture disposed along a portion of said elongated body member;
a transparent member having a first end, a second end and a sidewall; and
means for retaining said transparent member aligned with said aperture, said means for retaining disposed within said elongated body member;
wherein said sidewall defining a second internal passageway therethrough extending from the first end to the second end of said transparent member, said second internal passageway communicating with the first internal passageway of said body member, said visible flame pipe further comprising means for directing a combustion flame down a middle region of said second internal passageway, said means for directing disposed within said elongated body member.

6. The visible flame pipe of claim 5, wherein said means for directing comprises a shield having an inward tapered throat portion disposed within said first internal passageway intermediate said second stop means and the second end of said transparent member.

7. The visible flame pipe of claim 2, further comprising means for protecting said transparent member when disposed within said first internal passageway, said means for protecting disposed within said elongated body member.

8. The visible flame pipe of claim 3, wherein said protecting means is a first gasket disposed within said first internal passageway intermediate said compensating means and the first end of said transparent member and a second gasket disposed within said first internal passageway intermediate said second stop means and the second end of said transparent member.

9. The visible flame exhaust pipe of claim 1, further comprising sealing means for preventing exhaust gases from continuously traveling along the inner surface of said body member, said sealing means disposed within said elongated body member.

10. The visible flame exhaust pipe of claim 1, further comprising means for illuminating the first internal passageway near said aperture, said means for illuminating attached to said elongated body member.

11. The visible flame exhaust pipe of claim 10, wherein said means for illuminating is a light attached to said elongated body member.

* * * * *